(12) United States Patent
Liu

(10) Patent No.: US 12,415,631 B2
(45) Date of Patent: Sep. 16, 2025

(54) TITLABLE WING AND UNMANNED AERIAL VEHICLE

(71) Applicant: AUTEL ROBOTICS CO., LTD., Shenzhen (CN)

(72) Inventor: Qiang Liu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/485,576

(22) Filed: Oct. 12, 2023

(65) Prior Publication Data

US 2024/0043146 A1 Feb. 8, 2024

Related U.S. Application Data

(63) Continuation of application No. PCT/CN2022/084128, filed on Mar. 30, 2022.

(30) Foreign Application Priority Data

Apr. 2, 2021 (CN) .......................... 202110363250.1

(51) Int. Cl.
*B64U 30/12* (2023.01)
*B64C 3/38* (2006.01)
(Continued)

(52) U.S. Cl.
CPC .............. *B64U 30/12* (2023.01); *B64C 3/385* (2013.01); *B64C 29/0033* (2013.01);
(Continued)

(58) Field of Classification Search
CPC ... B64C 3/385; B64C 23/072; B64C 29/0033; B64U 30/297
See application file for complete search history.

(56) References Cited

U.S. PATENT DOCUMENTS

2017/0144771 A1* 5/2017 Lukaczyk .............. B64U 10/13
2017/0305568 A1* 10/2017 King ....................... B64D 27/12
(Continued)

FOREIGN PATENT DOCUMENTS

CN 105083550 A 11/2015
CN 109436314 A * 3/2019 ............. B64C 27/28
(Continued)

OTHER PUBLICATIONS

International Search Report mailed May 11, 2022; PCT/CN2022/084128 with English Translation.
(Continued)

*Primary Examiner* — Joshua J Michener
*Assistant Examiner* — Ryan Andrew Yankey

(57) ABSTRACT

Embodiments of the present disclosure relate to the technical field of unmanned aerial vehicles, in particular to a tiltable wing and an unmanned aerial vehicle. The tiltable wing includes a wing body, a wingtip, a power device, a cable, a rotating shaft and a driving mechanism. The power device is mounted on the wingtip; one end of the cable is connected to the power device, the rotating shaft is rotatably connected to the wing body and the wingtip, respectively, a through hole is disposed in an axial direction of the rotating shaft, and the other end of the cable passes through the through hole and extends to the inside of the wing body; the driving mechanism is used for driving the wingtip to rotate with the rotating shaft as an axis; and the power device is switchable between a first preset position and a second preset position relative to the wing body, so that the power device is switched between a horizontal state and a vertical state.

16 Claims, 7 Drawing Sheets

(51) Int. Cl.
 *B64C 29/00* (2006.01)
 *B64U 10/20* (2023.01)
 *B64U 30/297* (2023.01)

(52) U.S. Cl.
 CPC .......... *B64U 10/20* (2023.01); *B64C 29/0025* (2013.01); *B64U 30/297* (2023.01)

(56) References Cited

U.S. PATENT DOCUMENTS

| | | | |
|---|---|---|---|
| 2018/0251226 A1* | 9/2018 | Fenny | B64C 27/28 |
| 2021/0323663 A1* | 10/2021 | Liang | B64U 10/20 |
| 2022/0242563 A1* | 8/2022 | Wang | B64C 1/16 |
| 2022/0242564 A1* | 8/2022 | Liu | B64U 30/291 |
| 2023/0234729 A1* | 7/2023 | Liu | B64U 10/25 |

FOREIGN PATENT DOCUMENTS

| | | | | | |
|---|---|---|---|---|---|
| CN | 110371287 | A | | 10/2019 | |
| CN | 112009674 | A | | 12/2020 | |
| CN | 112158330 | A | * | 1/2021 | ............ B64C 27/08 |
| CN | 112977813 | A | | 6/2021 | |
| CN | 215826972 | U | * | 2/2022 | ............ B64C 27/26 |
| EP | 3798123 | A1 | * | 3/2021 | ............ B64C 11/28 |
| KR | 102110911 | B1 | | 5/2020 | |

OTHER PUBLICATIONS

Extended European Search Report dated Sep. 16, 22024; Appln. No. 22779034.2.

First Chinese Office Action dated Dec. 3, 2024; Appln. No. 202110363250.1 with English Translation.

* cited by examiner

TITLABLE WING AND UNMANNED AERIAL VEHICLE

CROSS-REFERENCE TO RELATED APPLICATION

The present application is a Continuation Application of International Application No. PCT/CN2022/084128, filed on Mar. 30, 2022, which claims the benefit of priority to Chinese patent Application No. 2021103632501, filed to the Chinese Patent Office on Apr. 2, 2021, the entire contents of which are incorporated herein by reference.

BACKGROUND

At present, a horizontal fixed-wing aircraft has been capable of completing high-speed and stable long-distance navigation, but it has to slide for a long distance to obtain a higher initial speed for take-off, so that there is a high demand on a take-off site, and at the same time, the horizontal fixed-wing aircraft will have the disadvantages of speed loss and incapability of achieving vertical take-off and landing or hovering. A vertical fixed-wing aircraft has the advantages of vertical take-off and landing, hovering in the air, and no need for complex take-off conditions, but it has the disadvantage of incapability of achieving high-speed and high-efficiency navigation. In order to achieve vertical take-off and landing, hovering in the air and high-speed and high-efficiency navigation, a wing-tiltable unmanned aerial vehicle has appeared. The wing-tiltable unmanned aerial vehicle is equipped with a tilting motor on each wing, and the tilting motor drives a power device to rotate, so that the power device is capable of rotating in horizontal and vertical directions.

It was found by the inventor in a process of implementing embodiments of the present disclosure that: at present, a cable for supplying power to the power device in the wing-tiltable unmanned aerial vehicle is disposed along a rotating shaft of the tilting motor, and when the tilting motor rotates, the cable will be wound around the rotating shaft of the tilting motor, and be folded and unfolded continuously along the rotating shaft of the tilting motor, so that the cable is easily pulled apart.

SUMMARY

Embodiments of the present disclosure relate to the technical field of unmanned aerial vehicles, in particular to a tiltable wing and an unmanned aerial vehicle. The technical problem to be mainly solved in embodiments of the present disclosure is to provide a tiltable wing and an unmanned aerial vehicle, by which the above-mentioned problem is overcome or at least partially solved.

According to a first aspect of the of the present disclosure, a technical solution adopted in an embodiment of the present disclosure is that: provided is a tiltable wing, including: a wing body; a wingtip; a powder device, a cable, a rotating shaft and a driving mechanism. The power device is mounted on the wingtip; one end of the cable is connected to the power device, the rotating shaft is rotatably connected to the wing body and the wingtip, respectively, a through hole is disposed in an axial direction of the rotating shaft, and the other end of the cable passes through the through hole and extends to the inside of the wing body; and the driving mechanism is used for driving the wingtip to rotate with the rotating shaft as an axis so that the power device is switchable between a first preset position and a second preset position relative to the wing body.

In order to solve the above-mentioned technical problem, another technical solution adopted in an embodiment of the present disclosure is that: provided is an unmanned aerial vehicle, including the tiltable wing in any one of the above-mentioned manners.

The second aspect of the present disclosure have the beneficial effects that: different from a situation in the prior art, the tiltable wing in the embodiment of the present disclosure includes a wing body, a wingtip, a power device, a cable, a rotating shaft and a driving mechanism. The power device is mounted on the wingtip; one end of the cable is connected to the power device, the rotating shaft is rotatably connected to the wing body and the wingtip, respectively, a through hole is disposed in an axial direction of the rotating shaft, and the other end of the cable passes through the through hole and extends to the inside of the wing body; the driving mechanism is used for driving the wingtip to rotate with the rotating shaft as an axis, so that the power device is switchable between a first preset position and a second preset position relative to the wing body, and the power device is switched between a horizontal state and a vertical state.

BRIEF DESCRIPTION OF THE DRAWINGS

To describe the technical solutions in specific embodiments of the present disclosure or the prior art more clearly, the accompanying drawings required for describing the specific embodiments or the prior art will be briefly introduced below. In all the accompanying drawings, similar elements or parts are generally marked with similar reference numerals in the accompanying drawings. In the accompanying drawings, all the elements or parts are not necessarily drawn in actual proportions.

Figure 1:
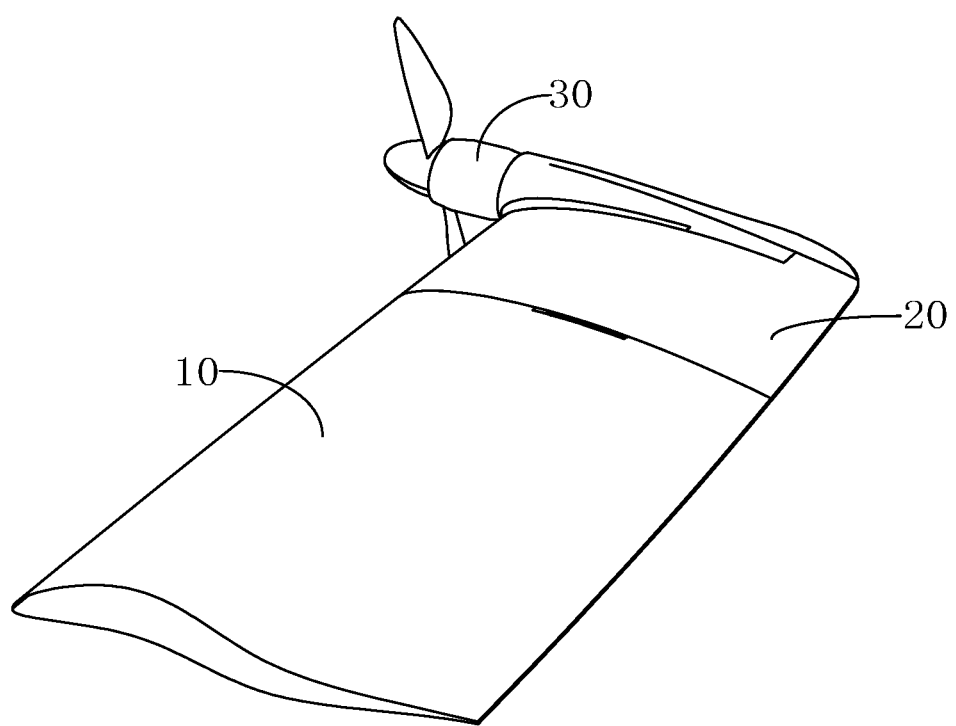
FIG. 1 is a partial stereogram of a tiltable wing in an embodiment of the present disclosure.

Reference numerals of parts of a tiltable wing 1 in the accompanying drawings will be described as follows:

| Name | Reference numeral | Name | Reference numeral |
|---|---|---|---|
| Wing body | 10 | Third mounting plate | 223 |
| Wing housing | 11 | Fourth mounting plate | 224 |
| First port cover | 111 | Power device | 30 |
| First support frame | 12 | Cable | 40 |
| First through hole | 121 | Rotating shaft | 50 |
| First connecting rod | 122 | First snap slot | 51 |
| First mounting plate | 123 | Second snap slot | 52 |
| Second mounting plate | 124 | First limiting block | 53 |
| Accommodating gap | 1241 | Driving mechanism | 60 |
| Wingtip | 20 | First driving device | 61 |
| Wingtip housing | 21 | First driving sheet | 62 |
| Second port cover | 211 | First sliding table | 621 |
| Second support frame | 22 | First sliding chute | 63 |
| Second through hole | 221 | First snap spring | 70 |
| Second connecting rod | 222 | Second snap spring | 80 |

DETAILED DESCRIPTION

In order to facilitate understanding the present disclosure, the present disclosure will be described in more details below in conjunction with the accompanying drawings and specific embodiments. It should be noted that when one element is stated as "fixed on"/"mounted on" the other element, it may be directly located on the other element, or there may be one or more centered elements therebetween. When one element is stated as "connected to" the other element, it may be directly connected to the other element, or there may be one or more centered elements therebetween. Directional or positional relationships indicated by terms such as "upper", "lower", "inner", "outer", "vertical" and "horizontal" used in the present specification are directional or positional relationships based on the accompanying drawings, are only intended to facilitate describing the present disclosure and simplifying the description, rather than to indicate or imply that the appointed device or element has to be located in a specific direction or structured and operated in the specific direction so as not to be understood as restrictions on the present disclosure. In addition, terms such as "first" and "second" are for descriptive purposes only, and cannot be understood as indicating or implying the relative importance.

Unless defined otherwise, all technical and scientific terms used in the present specification have the same meaning as commonly understood by the skilled in the art to which this technology belongs. The terms used in the specification of the present disclosure are only for the purpose of describing the specific embodiments, rather than limiting the present disclosure. The term "and/or" used in the present specification includes any one of one or more relevant listed items and all combinations thereof.

Figure 2:
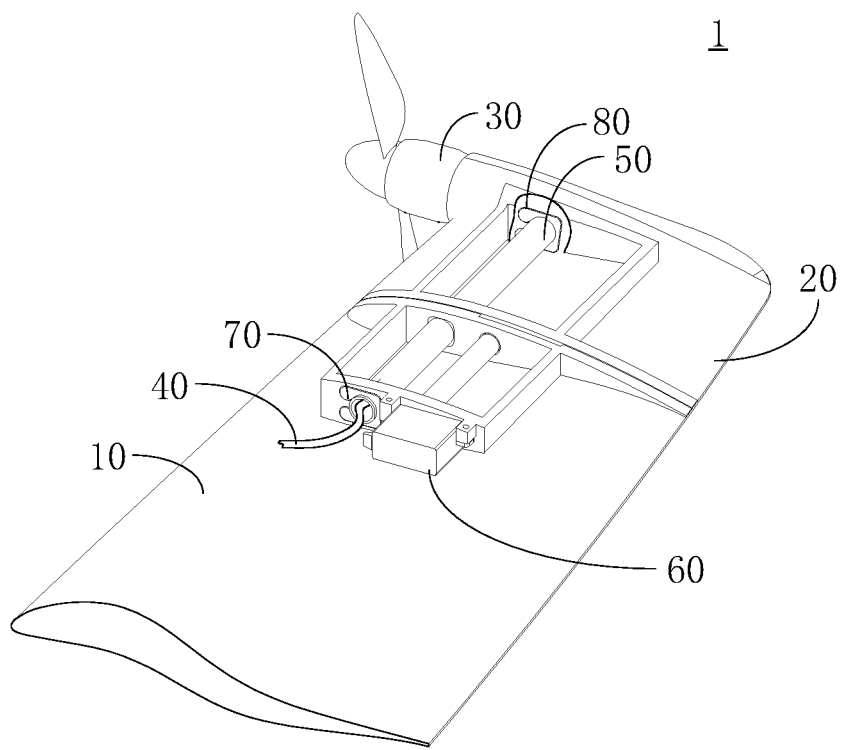
FIG. 2 is a partial sectional view of a tiltable wing in an embodiment of the present disclosure.

As shown in FIG. 1 and FIG. 2, the tiltable wing 1 includes a wing body 10, a wingtip 20, a power device 30, a cable 40, a rotating shaft 50, a driving mechanism 60, a first snap spring 70 and a second snap spring 80. The power device 30 is mounted on the wingtip 20; the power device 30 is used for supplying power, the rotating shaft 50 is rotatably connected to the wing body 10 and the wingtip 20, respectively, one end of the cable 40 is connected to the power device 30, the other end of the cable 40 passes through the rotating shaft 50 and extends to the inside of the wing body 10, and the cable 40 supplies electric energy and transfer a signal to the power device 30. The first snap spring 70 and the second snap spring 80 are in snap connection to two ends of the rotating shaft 50, the first snap spring 70 is abutted against the inner surface of the wing body 10, and the second snap spring 80 is abutted against the inner surface of the wingtip 20 to limit the wingtip 20 and the wing body 10, so that the wingtip 20 keeps fitting to the wing body 10 when rotating relative to the wing body 10, and no separation occurs. The driving mechanism 60 is mounted on the wing body 10 and is connected to the wingtip 20, and the wingtip 20 is switchable between a first preset position and a second preset position relative to the wing body 10 under the drive of the driving mechanism 60, so that the power device 30 is switched between a horizontal state and a vertical state.

Figure 3:
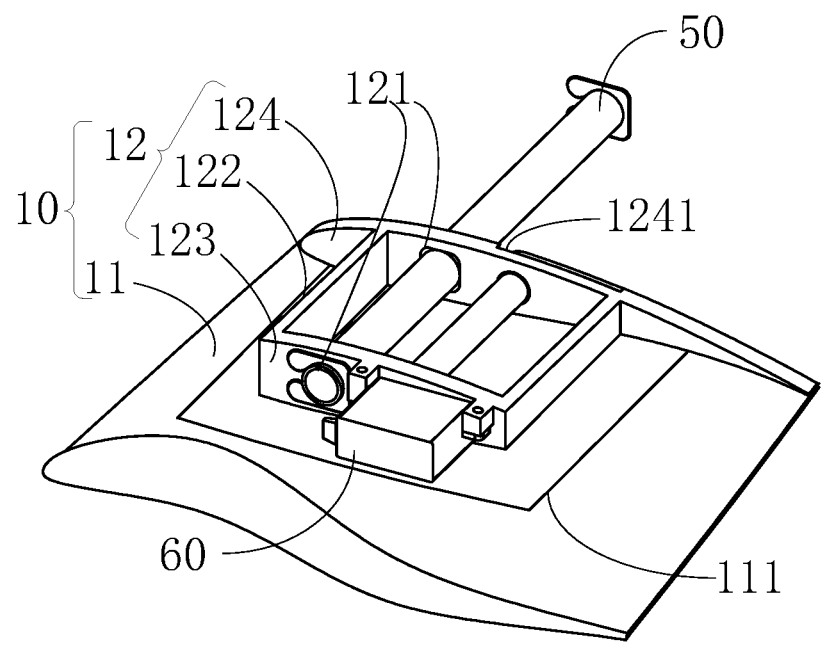
FIG. 3 is an assembly view of a wing body and a rotating shaft in an embodiment of the present disclosure.

For the above-mentioned wing body 10, as shown in FIG. 3, the wing body 10 includes a wing housing 11 and a first support frame 12. The first support frame 12 is accommodated in the wing housing 11, and the first support frame 12 is used for mounting the rotating shaft 50 and the driving mechanism 60.

The first support frame 12 includes a first connecting rod 122, a first mounting plate 123 and a second mounting plate 124, the first connecting rod 122 is fixed with the first mounting plate 123 and the second mounting plate 124, respectively, the first support frame 12 is of a truss structure, and such a structure mainly bears a greater axial tension or pressure and is uniform in axial force distribution, thereby being capable of reducing the self-weight and improving the rigidity as comparison with a solid web girder structure made of the same material. Each of the first mounting plate 123 and the second mounting plate 124 is provided with a first through hole 121, that is, there are two first through holes 121, one of the first through holes 121 is disposed in the first mounting plate 123, and the other first through hole 121 is disposed in the second mounting plate 124, the two first through holes 121 are used for splicing the rotating shaft 50, one end of the rotating shaft 50 passes through one of the first through holes 121, and the middle of the rotating shaft 50 passes through the other first through hole 121, so that the rotating shaft 50 is fixed on the first mounting plate 123 and the second mounting plate 124. The rotating shaft 50 is borne on the first mounting plate 123 and the second mounting plate 124 at the same time so as to be firmer and more stable.

In some embodiments, a section of each of the first through holes 121 is of a corner-cut rectangle, and a section of a part 1, spliced in the first through hole 121, of the rotating shaft 50 is also of a corner-cut rectangle, so that the circumferential rotation of the rotating shaft 50 can be limited when the first through holes 121 are matched with the rotating shaft 50, and then, it is more convenient to fix the rotating shaft 50. An accommodating gap 1241 is disposed in a surface, away from the first mounting plate 123, of the second mounting plate 124. The accommodating gap 1241 is used for accommodating parts of elements of the driving mechanism 60.

It can be understood that the structure of the first support frame 10 is not limited to the above-mentioned structure, and may also be other structures, the number of the first through holes 121 is not limited to be two, and may also be one, for example, the first support frame 10 is a solid supporting block, there is only one first through hole 121, and the first through hole is disposed to pass through the supporting block.

In some embodiments, the wing housing 11 is provided with a first maintenance port (unshown), the wing body 10 further includes a first port cover 111, the first port cover 111 covers the first maintenance port, the first support frame 12 is located below the first maintenance port, the first maintenance port may be opened or closed by the first port cover 111, and therefore, it is convenient for a user to overhaul the rotating shaft 50 and the driving mechanism 60.

Figure 4:
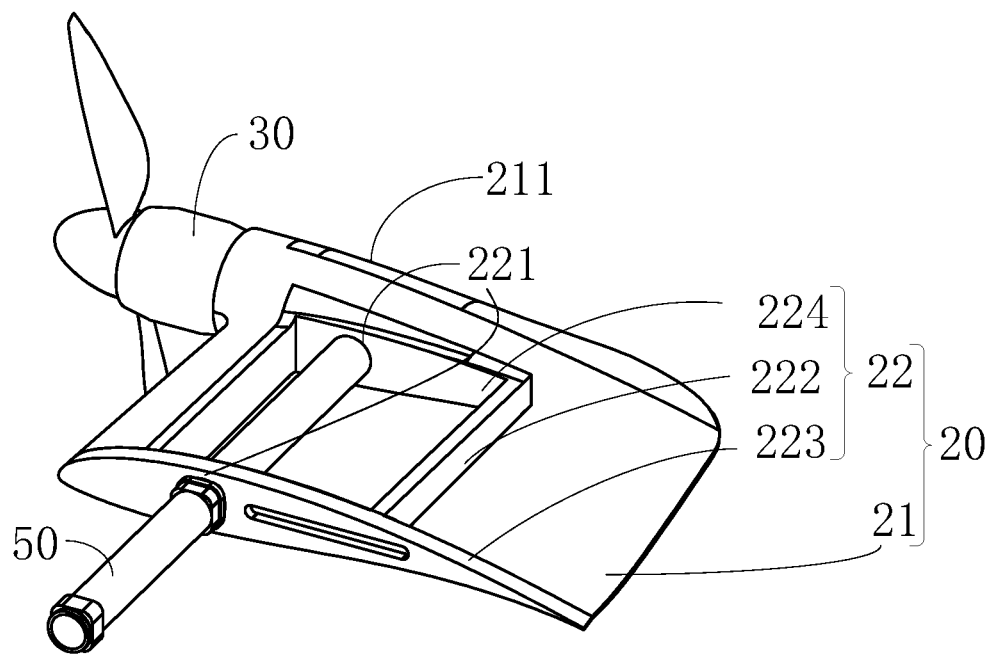
FIG. 4 is an assembly view of a wingtip, a power device and a rotating shaft in an embodiment of the present disclosure.

For the above-mentioned wingtip 20, as shown in FIG. 4, the wingtip 20 includes a wingtip housing 21 and a second support frame 22, and the second support frame 22 is accommodated in the wingtip housing 20.

The second support frame 22 includes a second connecting rod 222, a third mounting plate 223 and a fourth mounting plate 224, and two ends of the second connecting rod 222 are fixed with the third mounting plate 223 and the fourth mounting plate 224, respectively. Each of the third mounting plate 223 and the fourth mounting plate 224 is provided with a second through hole 221, that is, there are two second through holes 221, one of the second through holes 221 is disposed in the third mounting plate 223, and the other second through hole 221 is disposed in the fourth mounting plate 224. The other end of the rotating shaft 50 passes through the two second through holes 221, and the rotating shaft 50 is capable of rotating relative to the second through holes 221, so that the wingtip housing 21 can rotate around the rotating shaft 50. In some embodiments, a section of each of the second through holes 221 is circular, and a part, spliced in the second through holes 221, of the rotating shaft 50 is also circular, so that the rotating shaft 50 is capable of rotating in the second through holes 221.

In some embodiments, the wingtip housing 21 is further provided with a second maintenance port (unshown in the figures), the wingtip 20 further includes a second port cover 211, and the second port cover 211 is disposed on the second maintenance port of the wingtip housing 21 and is used for opening or closing the second maintenance port so as to facilitate overhauling elements located in the wingtip 20.

Figure 5:
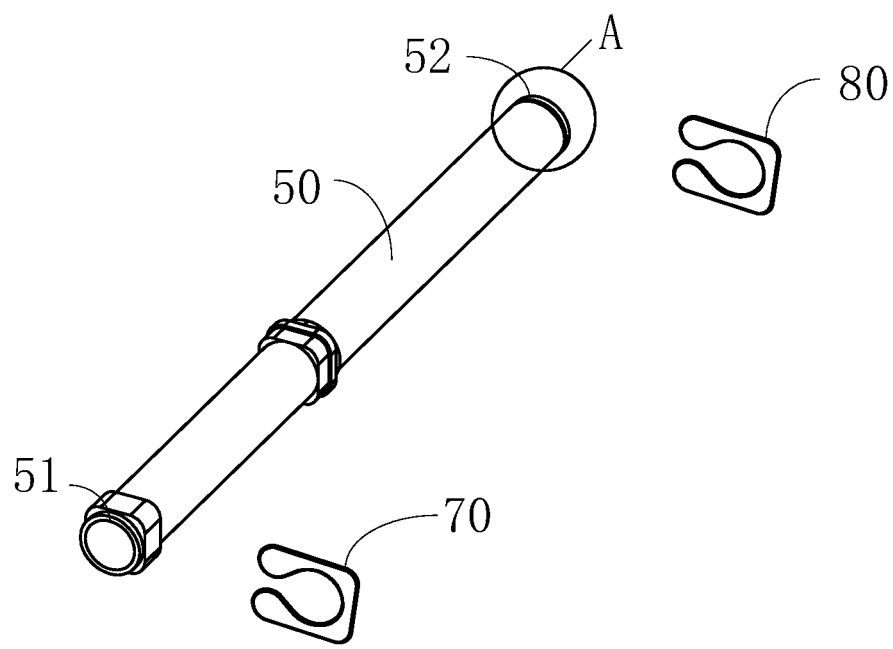
FIG. 5 is an exploded view of a rotating shaft, a first snap spring and a second snap spring in an embodiment of the present disclosure.
Figure 6:
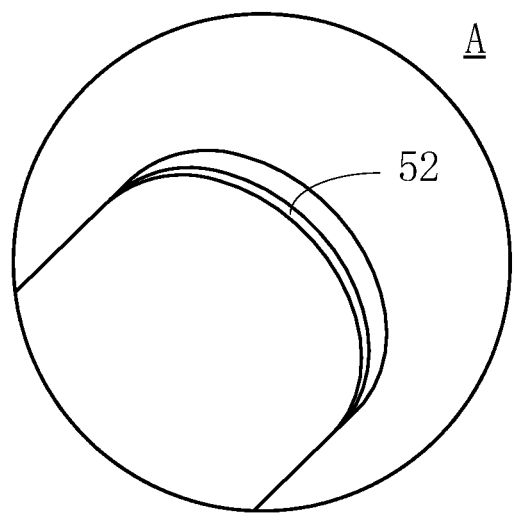
FIG. 6 is an enlarged view of part A in FIG. 5 in an embodiment of the present disclosure.
Figure 7:
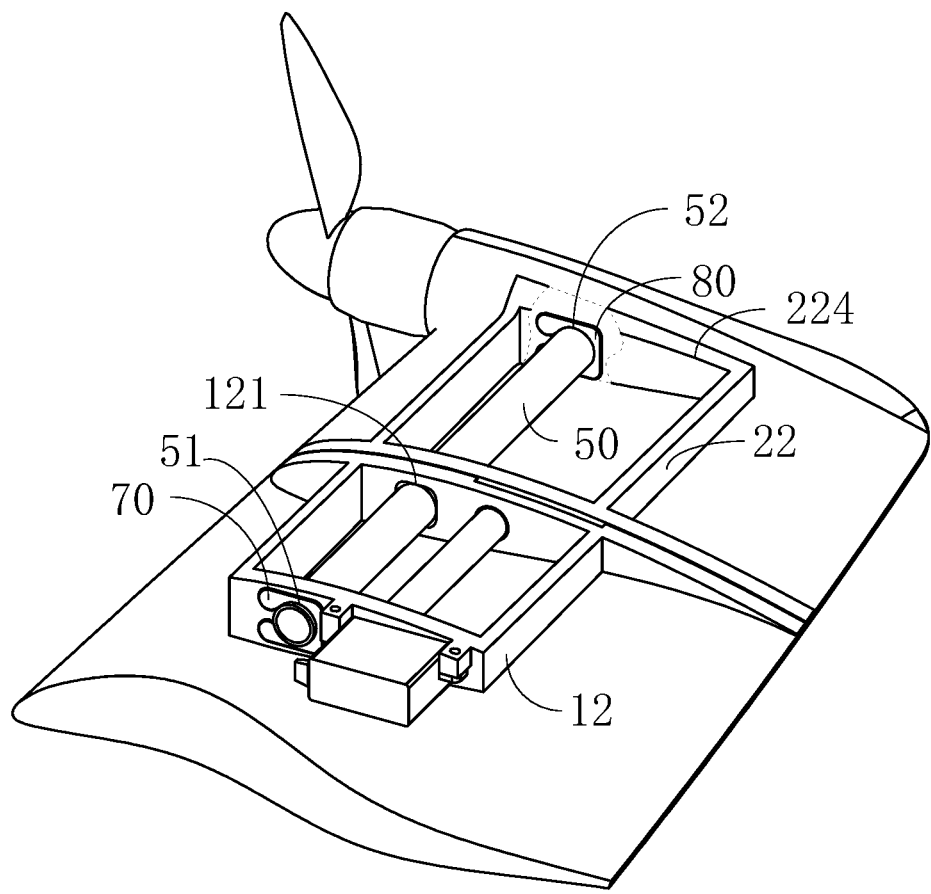
FIG. 7 is a schematic assembly view of a rotating shaft and other parts in an embodiment of the present disclosure.
Figure 8:
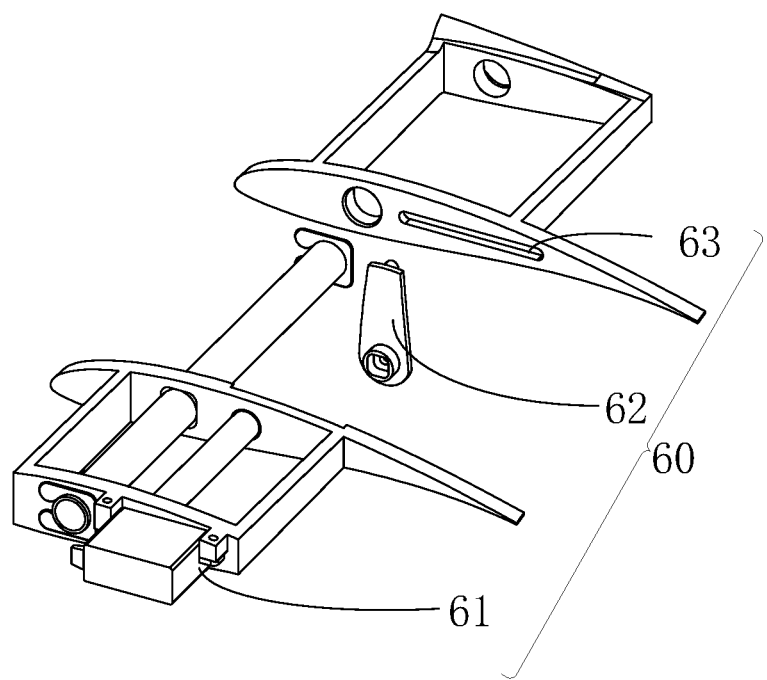
FIG. 8 is a partial exploded view of a tiltable wing in an embodiment of the present disclosure.
Figure 9:
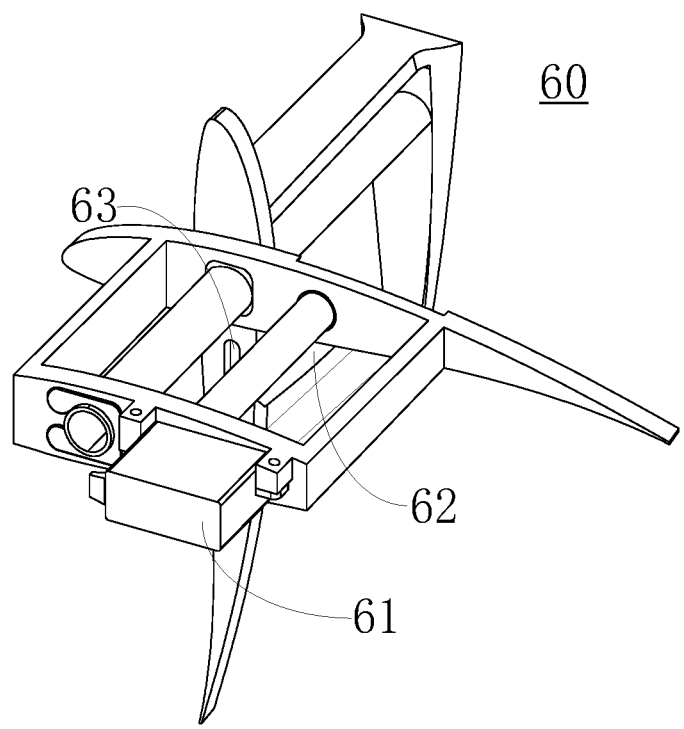
FIG. 9 is a stereogram of a driving device in an embodiment of the present disclosure.
Figure 10:
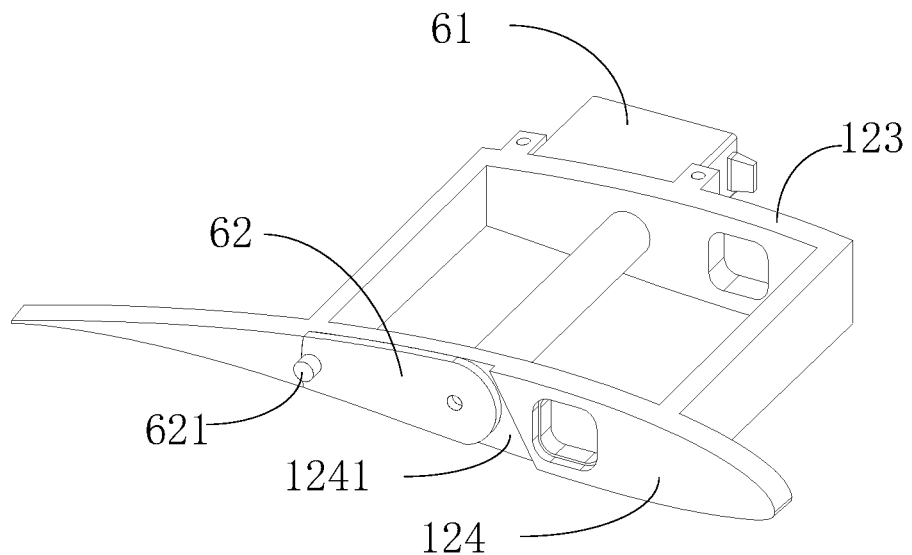
FIG. 10 is a partial schematic view of a driving device in an embodiment of the present disclosure.

For the above-mentioned rotating shaft 50, the first snap spring 70 and the second snap spring 80, as shown in FIG. 5 to FIG. 7, one end of the rotating shaft 50 is spliced and fixed in the first through holes 121, the other end of the rotating shaft 50 is spliced in the second through holes 221, and the rotating shaft 50 is capable of rotating in the second through holes 221. One end of the rotating shaft 50 is provided with a first snap slot 51, the other end of the rotating shaft 50 is provided with a second snap slot 52, and the rotating shaft 50 further extends to form two first limiting blocks 53. The first snap spring 70 is in snap connection to the first snap slot 51 and partially protrudes out of the first snap slot 51, a part, protruding out of the first snap slot 51, of the first snap spring 50 is abutted against a side, away from the second support frame 22, of the first support frame 12, the second snap spring 80 is in snap connection to the second snap slot 52 and partially protrudes out of the second snap slot 52, and a part, protruding out of the second snap slot 52, of the second snap spring 80 is abutted against a side, away from the first support frame 12, of the second support frame 22. The two first limiting blocks 53 have outer contours and are accommodated in the first through holes 121, respectively, and the first limiting blocks 53 are snapped in the first through holes 121, so that the rotating shaft 50 is incapable of rotating relative to the first through holes 121.

It can be understood that the fixation of the rotating shaft 50 and the first support frame 12 may be achieved by other structures which are not limited to the above-mentioned structure. For example, the first support frame 12 further includes locking levers (unshown in the figures), the number of the locking levers is two, the first mounting plate 123 and the second mounting plate 124 are further provided with fourth through holes (unshown in the figures), the rotating shaft 50 is further provided with fifth through holes (un-shown in the figures), the number of each of the fourth through holes and the fifth through holes is four, the fourth through holes are disposed around the first mounting plate 123 and the second mounting plate 124 along the radial direction of the rotating shaft 50, the fifth through holes and the fourth through holes are correspondingly disposed in the rotating shaft 50, the locking levers crosswise pass through the fourth through holes and the fifth through holes, and splicing parts of the locking levers are of mortise and tenon structures.

For the above-mentioned driving mechanism 60, as shown in FIG. 8 to FIG. 11, the driving mechanism 60 includes a first driving device 61, a first driving plate 62 and a first sliding chute 63. The first driving device 61 is mounted on the first mounting plate 123, a driving shaft of the first driving device 61 is fixed with the first driving plate 62 after passing through the second mounting plate 124, and the first driving plate 62 is perpendicular to the driving shaft of the first driving device 61. A surface, away from the first driving device 61, of the first driving plate 62 is provided with a first sliding table 621. The first sliding chute 63 is disposed in a surface, facing the second mounting plate 124, of the third mounting plate 223, the first sliding table 621 is spliced in the first sliding chute 63 and is capable of sliding along the first sliding chute 63, and when the first driving device 61 drives the first driving plate 62 to rotate, the first sliding table 621 slides along the first sliding chute 63, thereby driving the wingtip 20 to rotate relative to the wing body 10. In some embodiments, the first sliding table 621 is of a cylinder, which is beneficial to the reduction of sliding resistance of the first sliding table 621 in the first sliding chute 63. When the wing body 10 is flush with the wingtip 20, the second mounting plate 124 is fitted to the third mounting plate 223, and the first driving plate 62 is accommodated in the accommodating gap 1241, so that the tiltable wing 1 is more beautiful.

Figure 11:
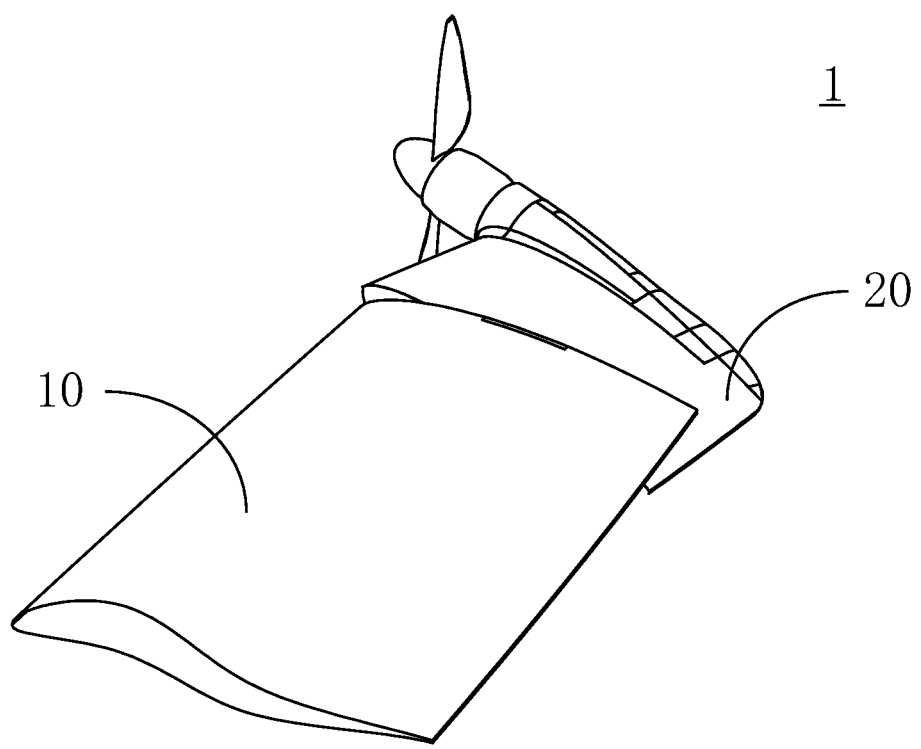
FIG. 11 is a schematic view of another working gesture of a driving device in an embodiment of the present disclosure.

It should be noted that, as shown in FIG. 11, the driving mechanism 60 may drive the wingtip 20 to rotate relative to the wing body 10 within any angle ranging from +/−130 DEG based on a horizontal plane which is 0 DEG.

It can be understood that the mounting manner of the above-mentioned driving mechanism 60 is not limited to the above-mentioned manner, the third mounting plate 223 is further provided with an accommodating slot (unshown in the figures), and the driving mechanism 60 further includes a second driving device (unshown in the figures), a second driving plate (unshown in the figures) and a second sliding chute (unshown in the figures), wherein the second driving plate is further provided with a second sliding table (unshown in the figures), the second driving device is mounted on the fourth mounting plate 224, a driving shaft of the second driving device is fixed with the second driving plate after passing through the fourth mounting plate 224, and the second sliding chute is disposed on a surface, facing the third mounting plate 223, of the second mounting plate 124. When the wing body 10 is flush with the wingtip 20, the second mounting plate 124 is fitted to the third mounting plate 223, the second driving plate is accommodated in the accommodating slot, the second sliding table is spliced in the second sliding chute and is capable of sliding along the second sliding chute, and when the second driving device drives the second driving plate to rotate, the second sliding table slides along the second sliding chute, thereby driving the wingtip 20 to rotate relative to the wing body 10.

In the embodiment of the present disclosure, the tiltable wing 1 includes a wing body 10, a wingtip 20, a power device 30, a cable 40, a rotating shaft 50 and a driving mechanism 60. The power device 30 is mounted on the wingtip 20; one end of the cable 40 is connected to the power device 30, the rotating shaft 50 is rotatably connected to the wing body 10 and the wingtip 20, respectively, a through hole is disposed in an axial direction of the rotating shaft 50, and the other end of the cable 40 passes through the through hole and extends to the inside of the wing body 10; the driving mechanism 60 is used for driving the wingtip 20 to rotate with the rotating shaft 50 as an axis, so that the power device 30 is switchable between a first preset position and a second preset position relative to the wing body 10, and the power device 30 is switched between a horizontal state and a vertical state. The cable 40 passes through the through hole in the axial direction of the rotating shaft 50 and extends to the wing body 10, and the driving mechanism 60 is separated from the cable 40, so that the cable 40 can neither be wound around a driving shaft of the driving mechanism 60 with the tilting motion of the driving mechanism 60, nor be folded and unfolded continuously along the driving shaft of the driving mechanism 60, and then, the risk that the cable 40 is pulled apart is reduced.

Figure 12:
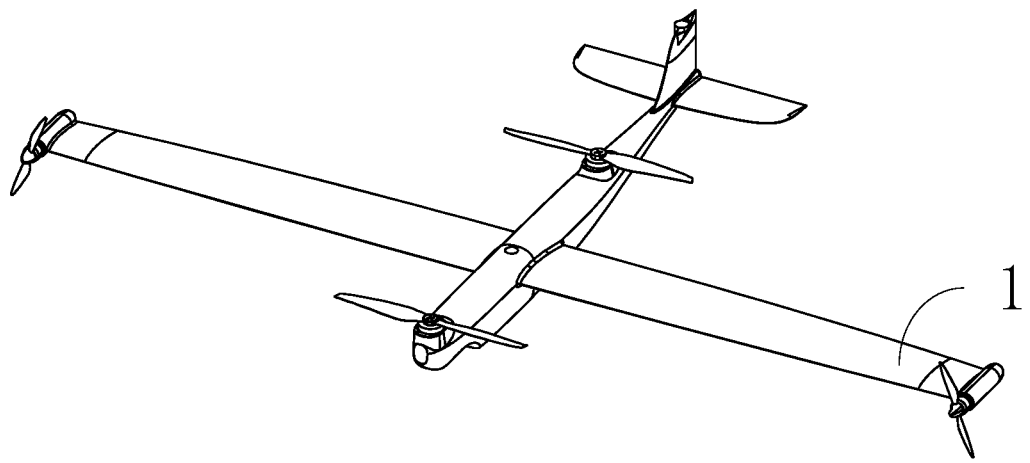
FIG. 12 is a schematic view of an unmanned aerial vehicle in an embodiment of the present disclosure.
Figure 13:
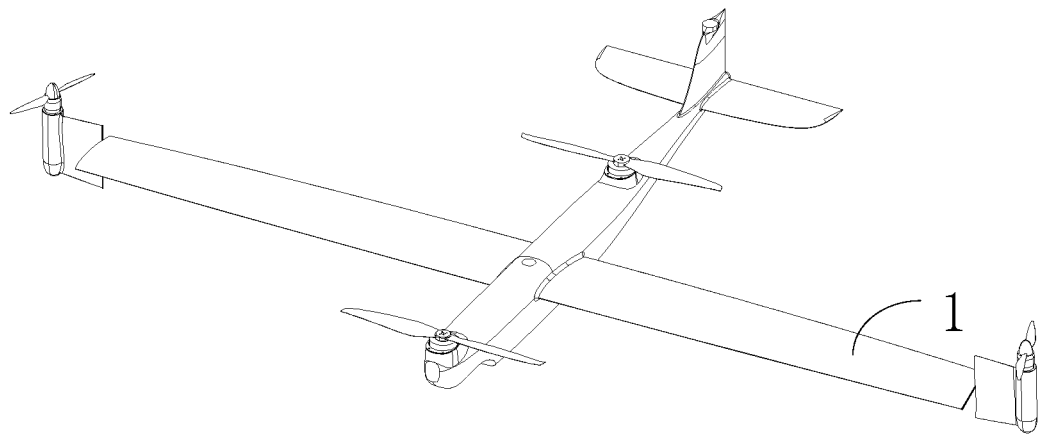
FIG. 13 is a schematic view of another working gesture of an unmanned aerial vehicle in an embodiment of the present disclosure.

An embodiment of the present disclosure further provides an unmanned aerial vehicle, as shown in FIG. 12 and FIG. 13, the unmanned aerial vehicle includes the above-mentioned tiltable wing 1, and the structure and functions of the tiltable wing 1 refer to those in the above-mentioned embodiment so as not to be repeated one by one herein.

Alternatively, the driving mechanism includes a first driving device, a driving plate and a sliding chute; the first driving device is mounted on the wing body, the sliding chute is disposed in the wingtip, a driving shaft of the first driving device is connected to the driving plate, a surface, away from the first driving device, of the driving plate is provided with a sliding table, the sliding table is spliced in the sliding chute and is capable of sliding along the sliding chute, and when the first driving device drives the driving plate to rotate, the sliding table slides along the sliding chute, thereby driving the wingtip to rotate relative to the wing body.

Alternatively, the wing body includes a first support frame and a wing housing, the first support frame is accommodated in the wing housing, the wingtip includes a second support frame and a wingtip housing, and the second support frame is accommodated in the wingtip housing; and the rotating shaft is fixed with the first support frame, the rotating shaft is rotatably connected to the second support frame, the first driving device is mounted on the first support frame, and the sliding chute is disposed in the second support frame.

Alternatively, the first support frame is provided with first through holes, the second support frame is provided with second through holes, the rotating shaft sequentially passes through the first through holes and the second through holes, wherein the rotating shaft is fixed in the first through holes and is capable of rotating in the second through holes.

Alternatively, one end of the rotating shaft is provided with a first snap slot, and the other end of the rotating shaft is provided with a second snap slot; and the tiltable wing further includes a first snap spring and a second snap spring, the first snap spring is in snap connection to the first snap slot and partially protrudes out of the first snap slot, a part, protruding out of the first snap slot, of the first snap spring is abutted against a side, away from the second support frame, of the first support frame, the second snap spring is in snap connection to the second snap slot and partially protrudes out of the second snap slot, and a part, protruding out of the second snap slot, of the second snap spring is abutted against a side, away from the first support frame, of the second support frame.

Alternatively, the number of the first through holes is two, and the number of the second through holes is two; the first support frame includes a first connecting rod, a first mounting plate and a second mounting plate, two ends of the first connecting rod are fixed with the first mounting plate and the second mounting plate, respectively, one of the first through holes is disposed in the first mounting plate, and the other first through hole is disposed in the second mounting plate; the second support frame includes a second connecting rod, a third mounting plate and a fourth mounting plate, two ends of the second connecting rod are fixed with the third mounting plate and the fourth mounting plate, respectively, one of the second through holes is disposed in the third mounting plate, and the other second through hole is disposed in the fourth mounting plate; the rotating shaft sequentially passes through the two first through holes and the two second through holes; and the first driving device is mounted on the first mounting plate, the driving shaft of the first driving device is fixed with the driving plate after passing through the second mounting plate, and the sliding chute is disposed in a surface, facing the second mounting plate, of the third mounting plate.

Alternatively, an accommodating gap is disposed in a surface, facing the third mounting plate, of the second mounting plate, and when the wing body is flush with the wingtip, the second mounting plate is fitted to the third mounting plate, and the driving plate is accommodated in the accommodating gap.

Alternatively, the sliding table is of a cylinder.

Alternatively, each of the first support frame and the second support frame is of a truss structure. The cable passes through the rotating shaft and extends to the wing body, and the driving mechanism is separated from the cable, so that the cable can neither be wound around a driving shaft of the driving mechanism with the tilting motion of the driving mechanism, nor be folded and unfolded continuously along the driving shaft of the driving mechanism, and then, the risk that the cable is pulled apart is reduced.

The above descriptions are only embodiments of the present disclosure, but are not hence intended to limit the patent scope of the present disclosure. All equivalent structures or flow changes made according to contents of the specification and accompanying drawings of the present disclosure are directly or indirectly applied to other relevant technical fields and are equally included in the patent protection scope of the present disclosure. It should be understood by those of ordinary skill in the art that they may still modify the technical solutions recorded in each of the foregoing embodiments or equivalently substitute parts of technical features therein; and these modifications or substitutions do not make the essences of the corresponding technical solutions depart from the scope of the technical solutions of the embodiments of the present disclosure.

What is claimed is:

1. A tiltable wing being applied to an unmanned aerial vehicle, comprising:
   a wing body;
   a wingtip;
   a power device mounted on the wingtip;
   a cable, one end of the cable being connected to the power device;
   a rotating shaft rotatably connected to the wing body and the wingtip, a through hole being disposed in an axial direction of the rotating shaft, and the other end of the cable passing through the through hole and extending to the inside of the wing body; and a driving mechanism configured to drive the wingtip to rotate with the rotating shaft as an axis so that the power device is switchable between a first preset position and a second preset position relative to the wing body, the driving mechanism comprising a first driving device, a driving plate and a sliding chute, wherein the first driving device is mounted on the wing body, the sliding chute is disposed in the wingtip, a driving shaft of the first driving device is connected to the driving plate, the driving plate is perpendicular to the driving shaft of the first driving device, a surface, away from the first driving device, of the driving plate is provided with a sliding table, the sliding table is spliced in the sliding chute and is capable of sliding along the sliding chute, and when the first driving device drives the driving plate to rotate, the sliding table slides along the sliding chute driving the wingtip to rotate relative to the wing body.

2. The tiltable wing according to claim 1, wherein the wing body comprises a first support frame and a wing housing, the first support frame is accommodated in the wing housing, the wingtip comprises a second support frame and a wingtip housing, and the second support frame is accommodated in the wingtip housing; and the rotating shaft is fixed with the first support frame, the rotating shaft is rotatably connected to the second support frame, the first driving device is mounted on the first support frame, and the sliding chute is disposed in the second support frame.

3. The tiltable wing according to claim 2, wherein the first support frame is provided with first through holes, the second support frame is provided with second through holes, the rotating shaft sequentially passes through the first through holes and the second through holes, wherein the rotating shaft is fixed in the first through holes and is capable of rotating in the second through holes.

4. The tiltable wing according to claim 3, wherein one end of the rotating shaft is provided with a first snap slot, and the other end of the rotating shaft is provided with a second snap slot; and the tiltable wing further comprises a first snap spring and a second snap spring, the first snap spring is in snap connection to the first snap slot and partially protrudes out of the first snap slot, a part, protruding out of the first snap slot, of the first snap spring is abutted against a side, away from the second support frame, of the first support frame, the second snap spring is in snap connection to the second snap slot and partially protrudes out of the second snap slot, and a part, protruding out of the second snap slot, of the second snap spring is abutted against a side, away from the first support frame, of the second support frame.

5. The tiltable wing according to claim 4, wherein the number of the first through holes is two, and the number of the second through holes is two;

the first support frame comprises a first connecting rod, a first mounting plate and a second mounting plate, two ends of the first connecting rod are fixed with the first mounting plate and the second mounting plate, respectively, one of the first through holes is disposed in the first mounting plate, and the other of the first through hole is disposed in the second mounting plate;

the second support frame comprises a second connecting rod, a third mounting plate and a fourth mounting plate, two ends of the second connecting rod are fixed with the third mounting plate and the fourth mounting plate, respectively, one of the second through holes is disposed in the third mounting plate, and the other of the second through hole is disposed in the fourth mounting plate;

the rotating shaft sequentially passes through the two first through holes and the two second through holes; and the first driving device is mounted on the first mounting plate, the driving shaft of the first driving device is fixed with the driving plate after passing through the second mounting plate, and the sliding chute is disposed in a surface, facing the second mounting plate, of the third mounting plate.

6. The tiltable wing according to claim 5, wherein an accommodating gap is disposed in a surface, facing the third mounting plate, of the second mounting plate, and when the wing body is flush with the wingtip, the second mounting plate is fitted to the third mounting plate, and the driving plate is accommodated in the accommodating gap.

7. The tiltable wing according to claim 1, wherein the sliding table is shaped as a cylinder.

8. The tiltable wing according to claim 2, wherein each of the first support frame and the second support frame is a truss structure.

9. An unmanned aerial vehicle, comprising:

a tiltable wing, wherein the tiltable wing includes:
 a wing body;
 a wingtip;
 a power device mounted on the wingtip;
 a cable, one end of the cable being connected to the power device;
 a rotating shaft rotatably connected to the wing body and the wingtip, a through hole being disposed in an axial direction of the rotating shaft, and the other end of the cable passing through the through hole and extending to the inside of the wing body; and
 a driving mechanism configured to drive the wingtip to rotate with the rotating shaft as an axis so that the power device is switchable between a first preset position and a second preset position relative to the wing body, the driving mechanism comprising a first driving device, a driving plate and a sliding chute, wherein
  the first driving device is mounted on the wing body, the sliding chute is disposed in the wingtip, a driving shaft of the first driving device is connected to the driving plate, the driving plate is perpendicular to the driving shaft of the first driving device, a surface, away from the first driving device, of the driving plate is provided with a sliding table, the sliding table is spliced in the sliding chute and is capable of sliding along the sliding chute, and when the first driving device drives the driving plate to rotate, the sliding table slides along the sliding chute, thereby driving the wingtip to rotate relative to the wing body.

10. The unmanned aerial vehicle according to claim 9, wherein the wing body comprises a first support frame and a wing housing, the first support frame is accommodated in the wing housing, the wingtip comprises a second support frame and a wingtip housing, and the second support frame is accommodated in the wingtip housing; and the rotating shaft is fixed with the first support frame, the rotating shaft is rotatably connected to the second support frame, the first driving device is mounted on the first support frame, and the sliding chute is disposed in the second support frame.

11. The unmanned aerial vehicle according to claim 10, wherein
the first support frame is provided with first through holes, the second support frame is provided with second through holes, the rotating shaft sequentially passes through the first through holes and the second through holes, wherein the rotating shaft is fixed in the first through holes and is capable of rotating in the second through holes.

12. The unmanned aerial vehicle according to claim 11, wherein
one end of the rotating shaft is provided with a first snap slot, and the other end of the rotating shaft is provided with a second snap slot; and
the tiltable wing further comprises a first snap spring and a second snap spring, the first snap spring is in snap connection to the first snap slot and partially protrudes out of the first snap slot, a part, protruding out of the first snap slot, of the first snap spring is abutted against a side, away from the second support frame, of the first support frame, the second snap spring is in snap connection to the second snap slot and partially protrudes out of the second snap slot, and a part, protruding out of the second snap slot, of the second snap spring is abutted against a side, away from the first support frame, of the second support frame.

13. The unmanned aerial vehicle according to claim 12, wherein
the number of the first through holes is two, and the number of the second through holes is two;
the first support frame comprises a first connecting rod, a first mounting plate and a second mounting plate, two ends of the first connecting rod are fixed with the first mounting plate and the second mounting plate, respectively, one of the first through holes is disposed in the first mounting plate, and the other of the first through hole is disposed in the second mounting plate;
the second support frame comprises a second connecting rod, a third mounting plate and a fourth mounting plate, two ends of the second connecting rod are fixed with the third mounting plate and the fourth mounting plate, respectively, one of the second through holes is disposed in the third mounting plate, and the other of the second through hole is disposed in the fourth mounting plate;
the rotating shaft sequentially passes through the two first through holes and the two second through holes; and
the first driving device is mounted on the first mounting plate, the driving shaft of the first driving device is fixed with the driving plate after passing through the second mounting plate, and the sliding chute is disposed in a surface, facing the second mounting plate, of the third mounting plate.

14. The tiltable wing according to claim 13, wherein
an accommodating gap is disposed in a surface, facing the third mounting plate, of the second mounting plate, and when the wing body is flush with the wingtip, the second mounting plate is fitted to the third mounting plate, and the driving plate is accommodated in the accommodating gap.

15. The tiltable wing according to claim 9, wherein
the sliding table is shaped as a cylinder.

16. The tiltable wing according to claim 10, wherein
each of the first support frame and the second support frame is a truss structure.

* * * * *